A. GRUB.
FISH SCALING MACHINE.
APPLICATION FILED DEC. 5, 1908.
935,602.
Patented Sept. 28, 1909.
2 SHEETS—SHEET 1.
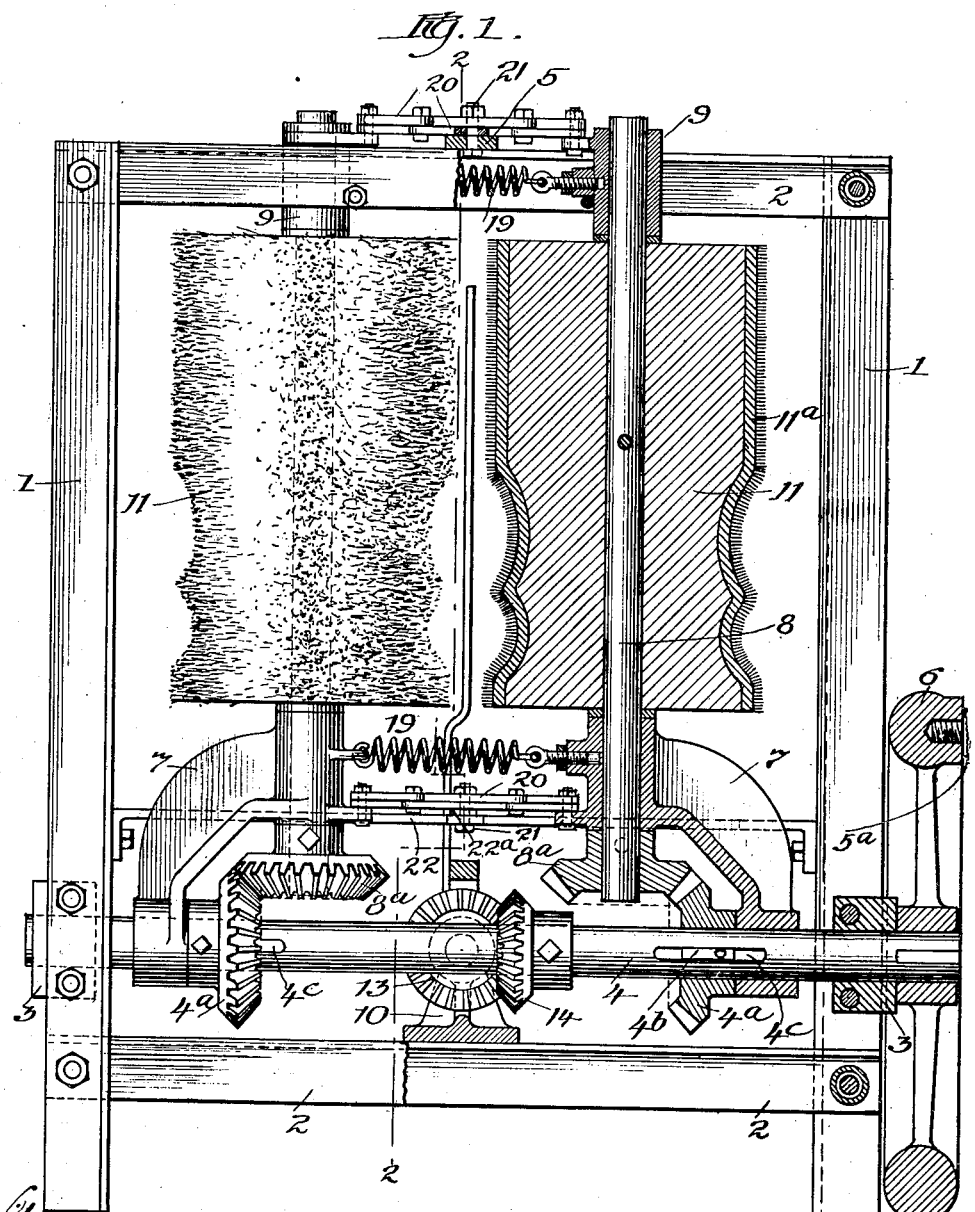

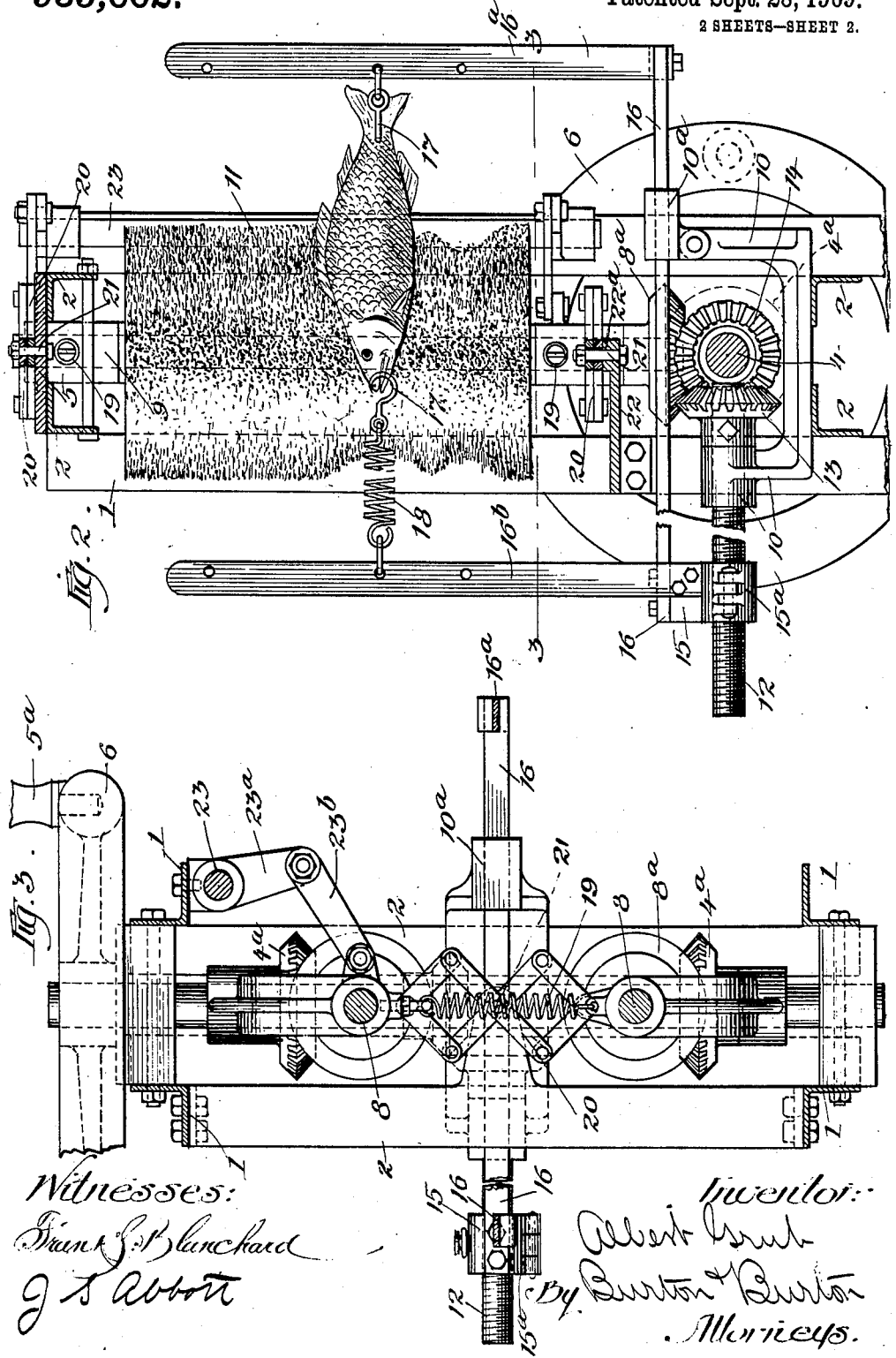

UNITED STATES PATENT OFFICE.

ALBERT GRUB, OF CHICAGO, ILLINOIS.

FISH-SCALING MACHINE.

935,602.  Specification of Letters Patent.  Patented Sept. 28, 1909.

Application filed December 5, 1908. Serial No. 466,052.

*To all whom it may concern:*

Be it known that I, ALBERT GRUB, a citizen of the United States, residing at Chicago, in the county of Cook and State of Illinois, have invented new and useful Improvements in Fish-Scaling Machines, of which the following is a specification, reference being had to the drawings forming a part thereof.

The purpose of this invention is to provide an improved apparatus for removing scales from fish.

It consists of the elements and features of construction shown and described as indicated in the claims.

In the drawings:—Figure 1 is a partly sectional side elevation of a machine embodying this invention, the section being made axially through one of the rolls and its operating gears. Fig. 2 is an end elevation of the same. Fig. 3 is a section at the line 3—3 on Fig. 2.

The machine shown in the drawings comprises a rigid frame which consists of two side members, each formed of two angle-iron uprights connected by longitudinal angle bars, 2, 2. These two side members are rigidly joined at three places,—(1) at their lower part by the journaled bearing bars, 3, 3, of the main power shaft, 4, which are bolted to the uprights; (2) by the carrying bracket, 10, hereinafter mentioned, which is mounted on the lower longitudinal angle bars, 2, and, (3) at the upper part by the cross tie, 5, which is bolted to and connects the upper longitudinal angle bars, 2, 2. The power shaft, 4, is provided with a fly wheel, 6, designed and adapted to be operated by hand for rotating the shaft. On said power shaft there are mounted for sliding,—preferably by the splined connection illustrated,—bearing brackets, 7, 7, in which there are journaled secondary shafts, 8, 8, at right angles to the power shaft, 4, operatively connected with said power shaft for rotation by the intermeshing bevel gears, $4^a$ and $8^a$, on said power shaft and secondary shafts respectively, the gears, $4^a$, being feathered on the shaft, 4, for rotation therewith and sliding thereon, as indicated, by the pins, $4^b$, taking through the slots, $4^c$, in the shaft. Upper journal bearings for the shafts, 8, 8, are provided in journal boxes, 9, mounted for sliding between the upper longitudinal frame bars, 2, 2, of the two side members, respectively. The shafts, 8, 8, carry scale-detaching rolls, 11, 11, and the gear connections described are arranged to revolve said rolls in the same direction at their proximate sides. For the purpose of detaching the scales, these rolls may be covered with wire card, $11^a$, as illustrated. For propelling or drawing the fish to be scaled between the rolls there is provided a feeding device comprising a screw shaft, 12, journaled in the bracket, 10, mounted as described upon the two lower longitudinal angle bars, 2, 2, extending across the same. On the inner end of said screw shaft, 12, there is secured a bevel gear, 13, which meshes with and is driven by a bevel gear, 14, fast on the shaft, 4.

15 is a traveler threaded for engaging the shaft, 12, and having connected to it for movement therewith a carriage consisting of a bar, 16, mounted for sliding in a bearing, $10^a$, on the gearing bracket, 10, and having rigid with it two upright arms, $16^a$ and $16^b$, respectively, which extend substantially parallel to the shafts, 8, 8, at opposite sides of the common plane of the axes of said shafts, and at opposite sides of the two rolls. Each of said uprights, $16^a$ and $16^b$, carries a fish-engaging hook, 17, the hook being connected with one of the uprights by means of a tensile spring, 18, the two hooks being adapted and designed to engage the two ends of the fish body, as shown in Fig. 2.

It will be understood from the foregoing description that the rotation of the power shaft, 4, not only rotates the two rolls, 11, 11, so that they may operate by their properly armored surfaces for detaching the scales from the fish passed between them, but also by rotation of the shaft, 12, causes the fish carriage having the traveler for engaging the screw shaft to be propelled transversely to the plane of the axes of the two rolls so as to draw the fish through between the latter. It is designed that the fish shall be entered and advanced tail foremost between the rolls, being thus entered at the side of the meeting plane of the rolls toward which they revolve at their proximate sides, so that the direction of rotation of the rolls on the surface of the fish will be the opposite of that in which the fish is propelled through between them, and opposite to the trend of the scales of the fish, thus insuring most effective action for disengaging the scales. Preferably the traveler, 15, is constructed for ready disengagement from the screw shaft, being for that purpose made in two parts hinged together as shown, the lower part, 15ª, being latched to the other part for operative engagement. When the fish has been propelled through between the rolls as described the operator, unlatching the lower member, 15ª, of the traveler, may spring up the bar, 16, at the end to which the traveler is secured, disengaging the latter from the screw shaft, so that the fish carriage, comprising said traveler and bar and uprights, can be immediately thrown back to the starting point for repetition of the action. For holding the two rolls toward each other so that they may press effectively upon the body of the fish, and may nevertheless be adapted to spread to permit fish of different sizes to pass through between them, there are provided springs, 19, 19, connecting the two sliding gearing brackets, 7, 7.

For some purposes it may be desirable to provide for equalizing the spreading movement of the two scale-detaching rolls so that they may be moved to equal extent from their meeting plane by any action tending to spread them. For this purpose the two gearing brackets, 7, 7, and also the two journal bearings, 9, 9, are connected by lazy-tongs structures, 20, 20, on which the middle pivot, 21, is fixedly mounted, that of the lower lazy-tongs being mounted in a lug, 22ª, of a longitudinal bar, 22, extended between the two uprights, 1, 1, at one side, and the pivot of the upper lazy-tongs being mounted in the cross-tie, 5. To prevent cramping of the bearings of the shafts, 8, 8, in spreading of the rolls, and to accomplish this without unduly extending the slide bearing of the gearing bracket, 7, on the shaft, 4, there is preferably provided a vertical rock-shaft, 23, having journal bearings on one of the uprights, 1, said shaft having two lever arms, 23ª, near its upper and lower ends respectively, conneccted respectively by links, 23ᵇ, with the gearing bracket, 7, and journal bearings, 9, of one of the roll shafts. This expedient, together with the lazy tongs construction transmitting equal movement from the bearings of one shaft to the corresponding bearings of the other shaft, relieves both of said shafts of liability to cramping.

I claim:—

1. In a fish-scaling machine, in combination with a pair of scale-detaching rolls; means for revolving them in the same direction at their proximate sides; a screw shaft extending transversely to the common plane of the axes of said rolls; means for rotating it; a traveler engaged by the screw shaft, and means for guiding it for travel therealong, such traveler having two arms respectively at opposite sides of said plane and of the rolls, and fish-engaging means on each of said arms.

2. In a fish-scaling machine, in combination with a pair of scale-detaching rolls, means for revolving them in the same direction at their proximate sides; a screw shaft journaled transversely to the common plane of the axes of said rolls, and means for rotating it; a traveler engaged by the screw shaft and means for guiding it for travel therealong, said traveler having two arms located respectively at opposite sides of said plane and of the rolls; fish-engaging means carried by said arms respectively, and a spring operating on one of said means for straining the fish between them.

3. In a fish scaling machine, in combination with a pair of scale-detaching rolls, means for rotating them in the same direction at their proximate sides; and lazy-tongs connections between said bearings having a middle pivot fixed for equalizing the spread of the rolls from their meeting plane, and springs for yieldingly forcing said rolls toward each other.

4. In a fish-scaling machine, in combination with a pair of scale-detaching rolls; means for revolving them in opposite directions about their axes; springs operating to force the rolls yieldingly toward each other; lazy-tongs connections between the rolls having a middle pivot fixed for equalizing the spread of the rolls from the meeting plane; a rock shaft parallel to the roll shafts having two equal lever arms, and links from said lever arms respectively to the opposite end bearings of one of the rolls.

5. In a fish-scaling machine, in combination with a frame, a power-transmitting shaft journaled in such frame; gearing brackets mounted for sliding on the shaft; secondary shafts journaled in said gearing brackets respectively at right angles to the power shaft; intermeshing gears on the power shaft and said secondary shafts respectively for rotating said secondary shafts in the same direction at their proximate sides; fish-scaling rolls on said secondary shafts; springs for connecting said gearing brackets for holding said secondary shafts yieldingly toward each other; a screw shaft journaled in the frame at right angles to the power shaft; intermeshing bevel gears on said power shaft and screw shaft; a traveler mounted for sliding on the frame and engaged with the screw shaft, and fish-engaging means carried by said traveler.

In testimony whereof, I have hereunto set my hand, in the presence of two witnesses, at Chicago, Illinois, this 3d day of December, 1908.

ALBERT GRUB.

In the presence of—
JULIA S. ABBOTT,
M. GERTRUDE ADY.